United States Patent [19]

Philip et al.

[11] 4,197,523

[45] Apr. 8, 1980

[54] DIGITAL TELECOMMUNICATION SWITCHING SYSTEMS

[75] Inventors: Alexander S. Philip, Wimborne; Stephen Niewiadomski, Whiston; Frederick H. Rees, London; Anthony E. Shuttleworth, Burbage, all of England

[73] Assignees: The Plessey Company Limited, Ilford; Standard Telephones & Cables Limited; The General Electric Company Limited, both of London, all of England

[21] Appl. No.: 871,397

[22] Filed: Jan. 23, 1978

[30] Foreign Application Priority Data

Apr. 2, 1977 [GB] United Kingdom ............... 14035/77

[51] Int. Cl.² ...................... G08C 25/00; H04M 3/12
[52] U.S. Cl. ......................................... 371/49; 370/59
[58] Field of Search ............ 340/146.1 BE, 146.1 BA; 179/15 AE

[56] References Cited

U.S. PATENT DOCUMENTS

| 2,892,888 | 6/1959 | James et al. | 340/146.1 BE |
| 3,161,732 | 12/1964 | Martin et al. | 340/146.1 BE |
| 3,409,875 | 11/1968 | De Jager et al. | 340/146.1 BE |
| 3,940,566 | 2/1976 | Jeppson et al. | 340/146.1 BE |
| 3,967,250 | 6/1976 | Senda et al. | 340/146.1 BE |

*Primary Examiner*—Charles E. Atkinson
*Attorney, Agent, or Firm*—Fleit & Jacobson

[57] ABSTRACT

A digital switching telecommunications exchange handling pulse code modulated information samples in time division multiplex form on incoming and outgoing junctions. The exchange includes a receive interface for each incoming junction and a transmit interface for each outgoing junction and a pair of identical time division multiplex switching networks providing interconnection paths between any incoming junction channel and any outgoing junction channel. Under non-fault conditions exchange calls use indentical paths in each network and the transmit interfaces include error checking and comparison arrangements for each pair of information samples received under fault conditions the transmit interfaces can be arranged to select the non-faulty sample on a per channel basis or can be biased to select one network exclusively.

6 Claims, 3 Drawing Figures

DIGITAL TELECOMMUNICATION SWITCHING SYSTEMS

BACKGROUND OF THE INVENTION

The present invention relates to telecommunications systems employing digital switching and is more particularly concerned with the provisions of security arrangements involving cross-office path duplicated connections for use in such systems.

The switching networks used in telecommunication exchanges which handle digital data transmission carrying connections (such as pulse code modulation handling connections) are organised in accordance with so-called time division switching involving both time and space division switching techniques. Security in such switching networks is always a significant problem because of the high traffic carried by the time-shared highways and switching stages constituting the switching network. Schemes have been proposed in the prior art in which "M in N" types of sparing are provided for the various component parts of the switching network. However, such procedures pose severe problems of cabling and timing between main and spare units and add appreciably to the complexity of switch path selection arrangements.

To overcome such problems it has been suggested that the trunking in a digital switching network should be completely duplicated between the exchange receive and transmit transmission interfaces and it is an aim of the present invention to provide arrangements in the exchange transmission interfaces which exploit the provision of the duplicated switching planes to enhance the information handling security of the exchange.

SUMMARY OF THE INVENTION

According to the invention there is provided a digital switching network handling digital information samples in in time division multiplex form carried by incoming and outgoing exchange junction paths. The network includes a receive interface for each incoming junction path and a transmit interface for each outgoing junction path and first and second time division multiplex switching sub-networks. Each sub-network provides selectable connection between any one of the receive interfaces and any one of the transmit interfaces on a time division multiplex basis. Each receive interface is arranged to generate an error indicating code for each information sample received and to pass each information sample accompanied by its error indicating code to both the first and second switching sub-networks. Each transmit interface is arranged to compare each sample received from the first switching sub-network with that received from the second switching sub-network and when the samples differ to use the error detecting codes of each sample to decide which sample should be used for transmission over the outgoing exchange junction path served by the transmit interface.

Each transmit interface, according to a feature of the invention, includes alarm indicating means arranged to signal to an exchange common control device the detection of each information sample corrupted by its passage through a switching network and when the number of corruptions signalled from one of the switching-networks exceeds a predetermined threshold the common control device causes the transmit interfaces to be biased to accept only information samples from the other switching network.

BRIEF DESCRIPTION OF THE DRAWINGS

One embodiment of the invention will now be described with reference to the accompanying drawings which, at FIG. 1, shows an abbreviated block diagram of a digital switching exchange having a switchblock of the type shown in FIG. 2 which incorporates a digital line termination unit of the type shown in FIG. 3.

DETAILED DESCRIPTION OF THE INVENTION

Figure 1:
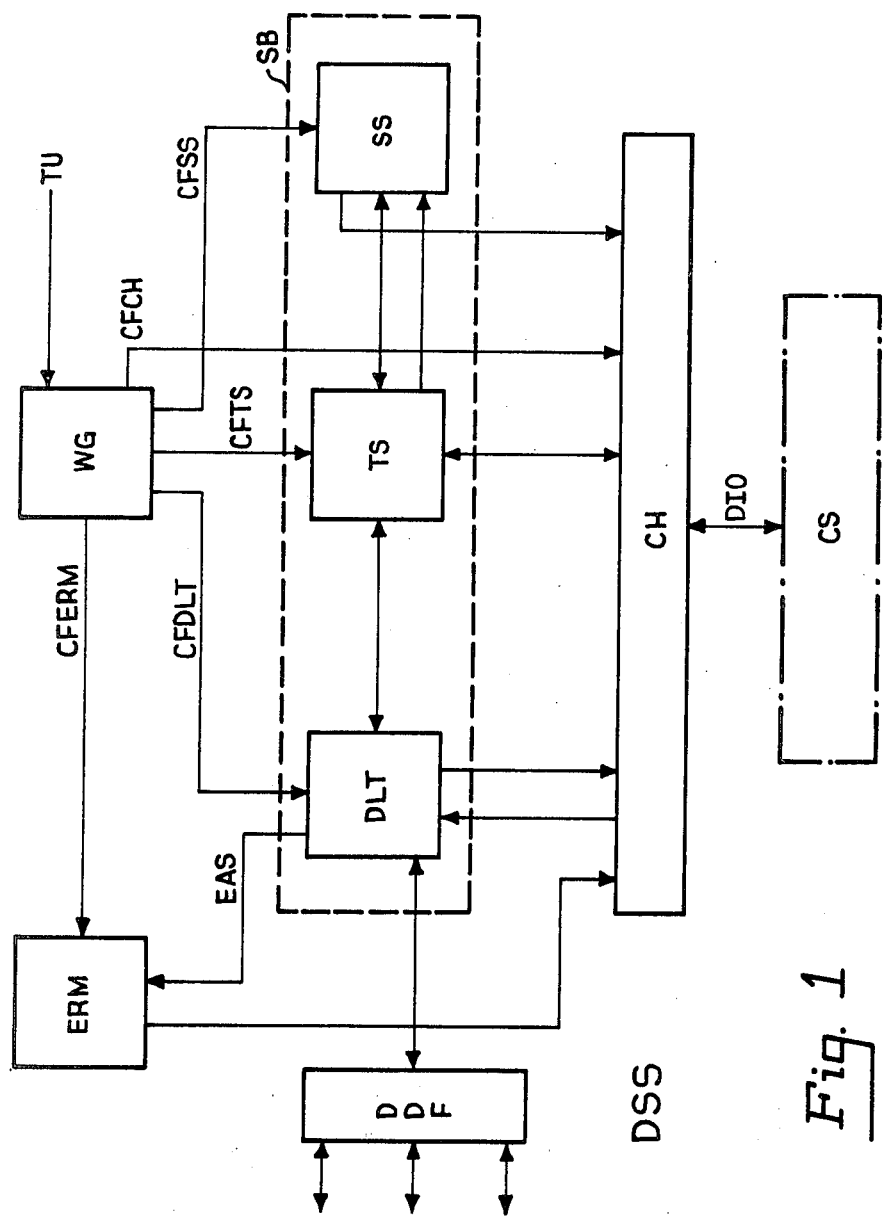

A digital switching exchange subsystem DSS suitable for use with one embodiment of the invention is shown in FIG. 1 and this exchange comprises a combination of hardware and software modules which provide a general purpose switching facility.

The subsystem (DSS) provides full accessibility between any two channels terminating on its switchblock SB and it is arranged to grow smoothly over a range of conversational traffic capacitites. Interruptions of service due to exchange extension are avoided by the use of a facility which allows one of a pair of duplicated switchblock planes to be "biased" to carry all calls.

The Digital Switching Subsystem switchblock, (SB) belongs to the Time-Space-Time, or so-called T-S-T, family. Specifically, segmentation of the central space stage results in a T(s)S(s)T format. The (s) component denotes an access mechanism between T stages and the central space switch (S) segments. Quality of service characteristics appropriate to the multiplexed nature of the traffic are satisfied by duplication of switching planes of the switchblock.

The subsystem DSS maintains a record of the busy/free state of each of its internal paths and in addition to selecting, setting up and clearing down connections, it is capable of tracing, busying and reserving paths.

Switching is performed with reference to a local timebase originated by a Timing Unit located in the Network Synchronisation Subsystem and supplied via the digital switching subsystem waveform generator (WG).

All bit streams terminating on the subsystem DSS are frame aligned external to the basic switching mechanism. Alignment-induced information loss occurs in integral frame units. The subsystem is responsible for insertion of all outgoing synchronisation patterns and additionally transmits idle codes to free lines.

The main switchblock SB also fulfils the role of an access switch, making connections to tone, signalling, maintenance, and other auxiliary units on a semi-permanent or call-by-call basis.

The subsystem DSS as mentioned previously is formed of a number of modules. These modules are shown in FIG. 1 and comprise a digital distribution frame (DDF), a switchblock module (SB), a control hardware module (CH), a waveform generator module (WG) and an error rate monitor module (ERM) together with a control software module (CS).

The switchblock SB consists of three modules shown in FIG. 1 as a digital line termination module DLT, a time switch TS and a space switch module SS.

Figure 2:
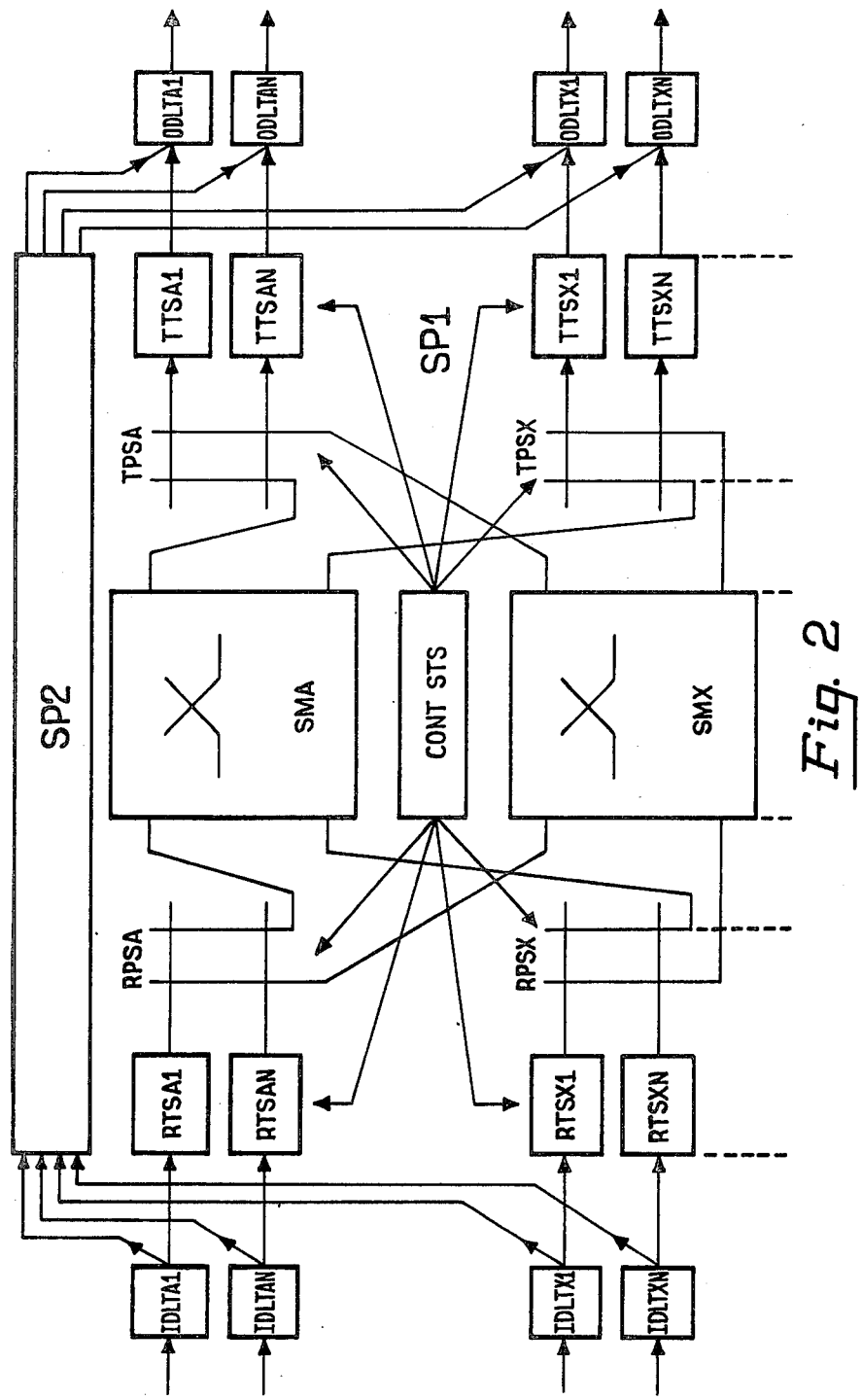

FIG. 2 shows the constitution of a typical switchblock SB in more detail. Two planes of T-(s)-S-(s)-T switching SP1 and SP2 are employed in the switchblock SB, however, only one such plane SP1 is shown in detail FIG. 2. The second plane SP2 is arranged to include identical modules to those shown in SP1 of FIG. 2. Each plane comprises a number of receive time switches RTSA1 to RTSXN, a space switching network array involving an (s)-S-(s) configuration together with a number of transmit time switches TTSA1 to TTSXN. The (s) sections are provided by the receive primary switches RPSA-RPSX and the transmit primary switches TPSA to TPSX. The central S section is formed by matrices SMA and SMX.

The time switching module TS is shown in FIG. 1 as being fed, from a data point of view, on one side by the digital line termination modules DLT and on the other side by the space switching module SS. The acutal sub-sections used to form the time switching module TS comprise the receive time switches (RTSA1-RTSXN in FIG. 2), the transmit time switches (TTSA1-TTSXN in FIG. 2) and the control stores (CONT STS). The control store arrangement CONT STS is also used to provide the addressing information for the space switch columns allowing the passage of a demultiplexed channel across the switching network into a selected location in a transmit time switch store. The transmit time switch location is selected under the control of information held in the control store arrangement also.

The control store arrangement comprises one control store for each receive time switch. Each control store is formed of 512 locations each location being of 21 bits. Each location is allocated to a cross-office slot and stores a receive time switch address and a transmit time switch address together with a call status code.

Each receive time switch, such as RTSA, comprises a serial-to-parallel conversion logic and a receive speech store RSSA having 512 locations of 9 bits per location and serving the receive paths of a group of up to 16 balanced aligned thirty two channel p.c.m. systems emanating from the corresponding digital line termination module overleads RSGA1 to 16. The information is written a channel at a time as it occurs into the receive speech store and it is extracted in parallel form (i.e. eight bits plus parity) under the control of the receive time switch control store CONT STA. Each receive speech store (such as RSSA) includes an output buffer BOA which provides duplicated outputs to the 2×2 space switching stage RPSA which operates on its input at twice the receive system p.c.m. bit rates.

Each transmit speech store (such as TSSA) comprises a 512 location store having 9 bits for each location and includes an input selector TSELA, forming the 2×2 space switch TPSA.

The input selector TSELA and the "write" store addressing are controlled by address information from the corresponding control store (such as CONT STS).

Each control store (CONT STS) as previously mentioned has one location for each cross-office slot-on an exchange highway and the information to select the receive speech store to the transmit speech store for each cross-office slot is programmed into the control store when a connection is set up by way of the input-/output logic such as I/O CLA. The cross-office slot address information is computed in the central control units of the hardware control module CH FIG. 1.

Figure 3:
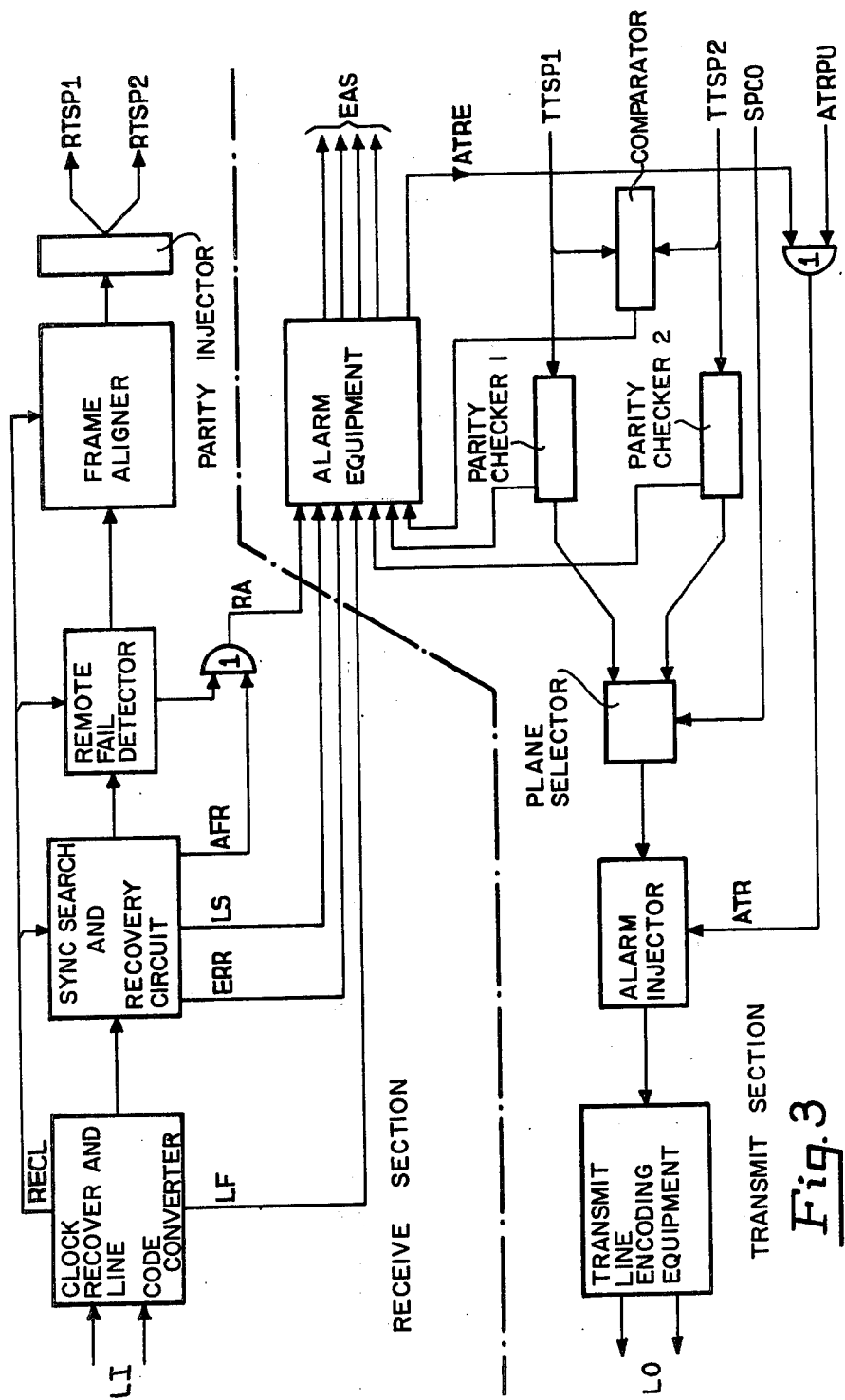

Each digital line termination unit DLT provides a number of basic line termination activities segregated into four circuit elements in a receive section (RS in FIG. 3) and two circuit elements in a transmit section TS. These activities will be considered briefly below relative to the referenced blocks of FIG. 3.

R1. CR/LCD

This circuit provides a clock recovery and line code conversion function. The recovered clock RECL provides a clock drive for the rest of the receive section whereas the line code conversion changes the HDB3 line signal to pure binary code. The line code decoder also includes a line fail alarm (signal LF) generator.

R2. SS&R

This circuit provides for synch. searching and recovery after the loss of a single frame synchronisation pattern is detected (signal ERR) or when a total loss of frame synchronisation is detected (signal LS). The synch. search and recovery circuit is also used to detect an alarm from the remote terminal (signal AFR).

R3. RDSFD

This circuit is used to detect a remote digital section failure which is the detection of no information being received (i.e. a good line signal carrying a frame synchronisation pattern but no information in any time slot).

R4. ALG

This circuit provides frame alignment between the local and remote clocks and alignment induced information loss is arranged to occur in integral frame units.

T1. S. I.

This circuit is used to insert remote alarm signals into time slots when instructed by the common control over lead ATRPU or from the alarm encoder AE over lead ATRE.

T2. LCE

This circuit is used to encode the binary samples passed from the transmit time switch stores into the HDB3 line transmission code.

In addition to the basic line termination activities the DLT plays an important role in the switch assembly mechanism.

Following frame alignment, the DLT inserts parity on the received speech samples using a parity bit generator PI before feeding switch planes at RTSP1 and RTSP2. The transmit part of the DLT function refers to the outgoing parity state at parity check circuits PCP1 and PCP2 to decide which security plane TTSP1 or TTSP2 of the switch should provide an output through the plane selector PS to the transmit line system via LCE.

The security plane selection will be performed in a channel conscious manner for each 32-channel transmit multiplex. Were the choice to be made on a permultiplex basis, the broadcasting of a fault from the receive side of the trunking could rapidly affect many or all the transmit selectors putting one complete transmit plane out of service. There would then be a significant probability of an unacceptable fault incidence in the remaining plane.

The selector on a transmit 32-channel multiplex will only adopt a continuous preference under the control of the security plane changeover signal SPCO for one plane if the error rate monitor indicates a regular fault incidence on a significant proportion of channels from the other plane. This fault threshold will be presettable to a level which will be determined by experience of prototype equipments.

Locking of the selector to one plane can also be used as an aid to maintenance and extension operations.

Also included in the Digital Line Termination Function is data comparison of the samples emerging from the two security planes TTSP1 and TTSP2 using comparator COMP. This detects the convergence of two different (but parity-correct) paths on one outlet channel.

The various alarm conditions detected by the parity check circuits PCP1 and PCP2 and the comparator COMP are passed to the alarm encoder AE. This encoder produces encoded alarm signals on leads EAS and these signals may be priority encoded according to the significance of the fault to the performance of the switchblock.

Typically the parity generator and parity check circuits use intergrated circuit devices of the type produced by Texas Instruments Ltd. under the trade name SN74180 whereas the comparators use devices having the trade name SN7485. Obviously alternative devices providing the same function could be employed. Further the embodiment of the invention has been described with reference to a digital switching arrangement using a time-space-time switching network having a particular space switch configuration. It will be apparent to those skilled in the art that alternative switching networks handling time division multiplex channels could readily be employed.

What we claim is:

1. A digital-switching network handling digital information samples in time division mutiplex form carried by incoming and outgoing network paths of a telecommunications exchange, the combination comprising:

a receive interface equipment for each incoming network path having an input path and an output path, the input path being connected to the incoming network path and including error code generating means arranged to generate an error indicating code for each information sample received and sample handling means arranged to pass each information sample accompanied by its error indicating code to the output path of the receive interface equipment;

a transmit interface equipment for each outgoing network path having first and second input paths and an output path and including comparison means arranged to compare each sample received on its two input paths and sample testing means operative when the samples differ to decide which sample should be passed to the output path served by the transmit interface equipment;

a first sub-network providing interconnecting paths between the receive interface equipments and the transmit interface equipments on a time division multiplex basis interconnecting the output path of a receive interface to the first input path of a transmit interface in each time division multiplex slot in accordance with telecommunication calls involving the network; and a second sub-network providing interconnecting paths between the receive interface equipments and transmit interface equipments on a time division multiplex basis in the same manner as the first sub-network but interconnecting the output path of the receive interface equipment to the second input path of the transmit interface in each time division mutliplex slot.

2. A digital switching network according to claim 1, wherein each transmit interface equipment includes means for detecting alarm conditions and alarm indicating means arranged to generate and send signals to an exchange common control device indicative of the detection of a corrupted information sample and each transmit interface includes means for biasing the transmit interface to accept information samples from one of the switching sub-networks only.

3. A digital switching network according to claim 1 or 2, wherein the error code generating means is a parity generator.

4. A digital switching network according to claim 3 wherein each input path in each transmit interface equipment includes parity checking arrangement.

5. A digital switching network according to claim 4, wherein each receive interface includes means for detecting line fault conditions and synchronization failure conditions and means for communicating alarm conditions indicative of those failure conditions to the common control device.

6. A digital switching network according to claim 5, wherein each transmit interface equipment includes means for inserting alarm signals generated by the common control device into selected channels of the outgoing network path served by the transmit interface equipment.

* * * * *